US009987901B2

(12) United States Patent
Matano et al.

(10) Patent No.: US 9,987,901 B2
(45) Date of Patent: Jun. 5, 2018

(54) HEAT-PUMP-TYPE AIR-CONDITIONING DEVICE

(71) Applicant: Nissan Motor Co. Ltd., Yokohama-shi, Kanagawa (JP)

(72) Inventors: Shinichi Matano, Atsugi (JP); Masahiro Onishi, Kamakura (JP); Kenji Iino, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 11 days.

(21) Appl. No.: 14/411,920

(22) PCT Filed: Aug. 16, 2013

(86) PCT No.: PCT/JP2013/072035
§ 371 (c)(1),
(2) Date: Dec. 30, 2014

(87) PCT Pub. No.: WO2014/041960
PCT Pub. Date: Mar. 20, 2014

(65) Prior Publication Data
US 2015/0165863 A1 Jun. 18, 2015

(30) Foreign Application Priority Data

Sep. 13, 2012 (JP) ................................. 2012-201479

(51) Int. Cl.
*F24F 1/40* (2011.01)
*F24F 13/24* (2006.01)
(Continued)

(52) U.S. Cl.
CPC ..... *B60H 1/00007* (2013.01); *B60H 1/00921* (2013.01); *B60H 1/3223* (2013.01);
(Continued)

(58) Field of Classification Search
CPC ................ B60H 1/3223; B60H 1/3229; B60H 1/00571; B60H 2001/006; F25B 2500/13;
(Continued)

(56) References Cited

U.S. PATENT DOCUMENTS 3,449,924 A * 6/1969 Sudmeier ............. B60H 1/3204
417/319
3,872,687 A * 3/1975 Bottum ................ B60H 1/3204
62/243
(Continued)

FOREIGN PATENT DOCUMENTS

EP 0904962 A2 3/1999
JP 61-58107 U 4/1986
(Continued)

OTHER PUBLICATIONS

"Machine Translation of JP 2005112253 A, Yokoyama, Apr. 2005".*

*Primary Examiner* — Frantz Jules
*Assistant Examiner* — Martha Tadesse
(74) *Attorney, Agent, or Firm* — Global IP Counselors, LLP

(57) ABSTRACT

A heat-pump-type air-conditioning device includes an electric compressor, a condenser, a coolant discharge pipe and a muffler. The electric compressor is disposed in a motor compartment of an electric vehicle, while the condenser is disposed in a passenger compartment. The coolant discharge pipe links the electric compressor and the condenser for channeling coolant from the electric compressor to the condenser. The muffler is provided at a position partway along the coolant discharge pipe for suppressing pulsation in the coolant discharged from the electric compressor. The muffler is disposed at a position higher up in the vehicle than the than a coolant discharge port of the electric compressor.

(Continued)

A coolant inflow port of the muffler is set at a position higher up in the vehicle than the than a coolant outflow port of the muffler.

6 Claims, 7 Drawing Sheets

(51) Int. Cl.
    *F16L 55/02*     (2006.01)
    *B60H 1/00*     (2006.01)
    *B60H 1/32*     (2006.01)
    *F25B 5/04*     (2006.01)
    *F25B 6/04*     (2006.01)

(52) U.S. Cl.
    CPC ............. *B60H 1/3229* (2013.01); *F25B 5/04* (2013.01); *F25B 6/04* (2013.01); *F25B 2400/0409* (2013.01); *F25B 2500/12* (2013.01); *F25B 2500/13* (2013.01)

(58) Field of Classification Search
    CPC ......... F25B 2500/12; F16L 55/02; F24F 1/40; F24F 13/24; F04B 39/0027; F04B 39/0044
    See application file for complete search history.

(56) References Cited

U.S. PATENT DOCUMENTS

| | | | | |
|---|---|---|---|---|
| 4,600,367 | A | | 7/1986 | Terauchi et al. |
| 5,545,860 | A | * | 8/1996 | Wilkes ............... B60H 1/00507 181/255 |
| 6,076,366 | A | * | 6/2000 | Takano .............. B60H 1/00571 62/196.1 |
| 2002/0020180 | A1 | * | 2/2002 | Takano .............. B60H 1/00885 62/196.4 |
| 2004/0079096 | A1 | * | 4/2004 | Itoh .................... B60H 1/00735 62/223 |
| 2011/0000243 | A1 | * | 1/2011 | Jabbour ................ F25B 41/003 62/296 |
| 2011/0265978 | A1 | * | 11/2011 | Zanardi ................ B60H 1/3227 165/157 |

FOREIGN PATENT DOCUMENTS

| | | | | | |
|---|---|---|---|---|---|
| JP | 06147175 | A | * | 5/1994 | ............ F01C 21/007 |
| JP | 3189547 | B2 | * | 7/2001 | ......... B60H 1/00571 |
| JP | 2002-120547 | A | | 4/2002 | |
| JP | 2005112253 | A | * | 4/2005 | |
| JP | 2006-219072 | A | | 8/2006 | |
| JP | 2007126990 | A | * | 5/2007 | |
| JP | 2008175066 | A | * | 7/2008 | |
| JP | 2009074485 | A | * | 4/2009 | |
| JP | 2011-20623 | A | | 2/2011 | |
| JP | 2012-116415 | A | | 6/2012 | |
| KR | 20140112752 | A | * | 9/2014 | ......... B60H 1/00571 |

* cited by examiner

HEAT-PUMP-TYPE AIR-CONDITIONING DEVICE

CROSS-REFERENCE TO RELATED APPLICATIONS

This application is a U.S. National stage application of International Application No. PCT/JP2013/072035, filed Aug. 16, 2013, which claims priority to Japanese Patent Application No. 2012-201479 filed in Japan on Sep. 13, 2012. The entire disclosure of Japanese Patent Application No. 2012-201479 is hereby incorporated herein by reference.

BACKGROUND

Field of the Invention

The present invention relates to a heat-pump-type air-conditioning device comprising a pulsation suppression device for suppressing pipe-internal pulsation in a position partway along a coolant discharge pipe linking an electric compressor and a condenser.

Background Information

Known in the art are configurations in which, when an onboard air-conditioning device is installed in an electric vehicle, an electric compressor disposed and set in a motor compartment is soft-mounted on a travel motor unit soft-mounted on a vehicle body, in order to suppress the input of vibration to the electric compressor (for example, see Japanese Laid-Open Patent Application No. 2011-20623).

SUMMARY

However, when an electric compressor is soft-mounted to a travel motor unit as disclosed in Patent Document 1, the space for setting structural components below the electric compressor is lost. Additionally, a coolant-pipe-connecting part of the dashboard panel comes to be in a higher position than the coolant discharge port of the electric compressor. Therefore, when a pulsation suppression device (a muffler or the like) for suppressing pipe-internal pulsation is provided to a coolant discharge pipe of the electric compressor of the heat-pump-type air-conditioning device, the pulsation suppression device must inevitably be disposed in a position above the electric compressor. Therefore, a problem is encountered in that some of the gas coolant remaining in the pulsation suppression device and the coolant discharge pipe due to the stopping of the electric compressor liquefies, and when this liquid coolant accumulates in the bottom of the pulsation suppression device, there is a risk that the liquid coolant will flow back from the pulsation suppression device to the electric compressor.

The present invention was devised in order to solve the problems described above, and the purpose of the invention is to provide a heat-pump-type air-conditioning device in which coolant backflow from a pulsation suppression device to an electric compressor when the compressor stops is prevented, while the pulsation suppression device is set in a position higher than the electric compressor.

To achieve the purpose described above, the premise of the present invention is that a heat-pump-type air-conditioning device comprises an electric compressor disposed in a motor compartment of an electric vehicle, a condenser disposed in a passenger compartment, and a coolant discharge pipe linking the electric compressor and the condenser and channeling coolant from the electric compressor to the condenser. In this heat-pump-type air-conditioning device, a pulsation suppression device for suppressing pulsation of the coolant discharged from the electric compressor is provided in a position partway along the coolant discharge pipe. The pulsation suppression device is disposed in a position higher up in the vehicle than a coolant discharge port of the electric compressor. A coolant inflow port of the pulsation suppression device is set in a position higher up in the vehicle than a coolant outflow port of the pulsation suppression device.

As described above, the coolant inflow port of the pulsation suppression device, which is disposed in a position higher up in the vehicle than the coolant outflow port of the electric compressor, is set in a position higher up in the vehicle than a coolant outflow port of the pulsation suppression device. Therefore, when the electric compressor stops, some of the gas coolant remaining in the pulsation suppression device and the coolant discharge pipe liquefies, and this liquid coolant accumulates in the bottom of the pulsation suppression device. This accumulated liquid coolant flows from the coolant outflow port set in a lower position than the coolant inflow port of the pulsation suppression device, to the condenser through the coolant discharge pipe. In other words, the liquid level of coolant accumulating in the bottom of the pulsation suppression device is stipulated to be the height position of the coolant outflow port, thus preventing coolant backflow to the electric compressor from the coolant inflow port set in a position higher than the coolant outflow port. Thus, the positional relationship of the coolant inflow port and coolant outflow port of the pulsation suppression device, which is disposed in a position higher up in the vehicle than the coolant discharge port of the electric compressor, is configured such that the coolant inflow port is set at a position higher than the coolant outflow port. Therefore, coolant backflow from the pulsation suppression device to the electric compressor when the compressor stops can be prevented while the pulsation suppression device is set in a position above the electric compressor.

BRIEF DESCRIPTION OF THE DRAWINGS

Referring now to the attached drawings which form a part of this original disclosure.

DETAILED DESCRIPTION OF THE EMBODIMENTS

Preferred embodiments of the heat-pump-type air-conditioning device of the present invention are described below.

First Embodiment

First, the configuration is described in accordance with the first embodiment. The configuration in the heat-pump-type air-conditioning device of the first embodiment is divided into "Onboard general configuration of the heat-pump-type air-conditioning device," "Overall system configuration of the heat-pump-type air-conditioning device," and "Detailed configuration of the apparatus structural components disposed in the motor compartment."

Onboard General Configuration of Heat-Pump-Type Air-Conditioning Device

Figure 1:
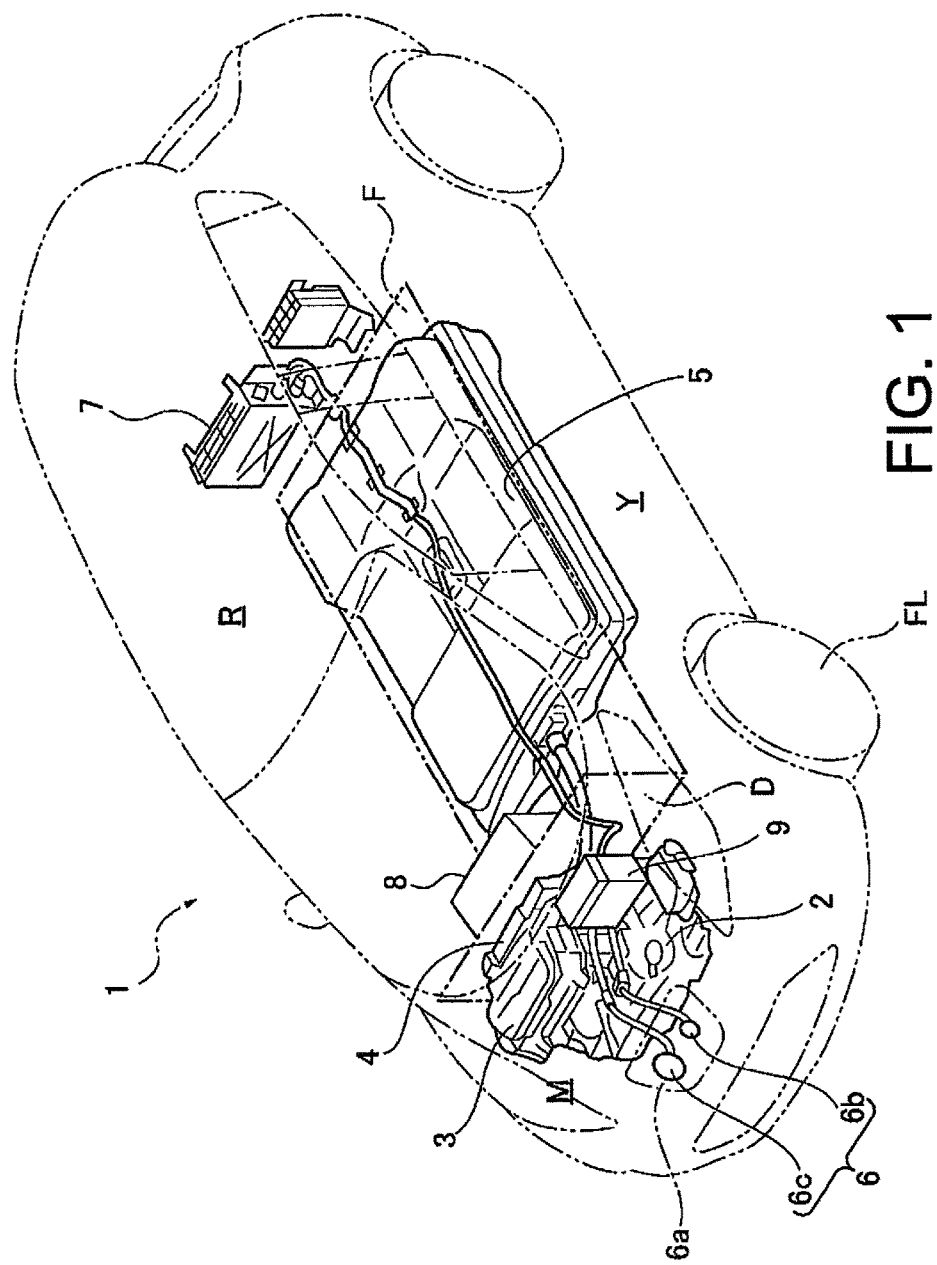
FIG. 1 is a perspective view showing the general configuration of a sedan-type electric vehicle equipped with a heat-pump-type air-conditioning device in accordance with a first embodiment.

FIG. 1 shows the general configuration of a sedan-type electric vehicle equipped with the heat-pump-type air-conditioning device of the first embodiment. The onboard general configuration of the heat-pump-type air-conditioning device is described below with reference to FIG. 1.

An electric vehicle 1 in which the heat-pump-type air-conditioning device of the first embodiment is installed comprises a travel motor unit 2, a drive motor inverter 3, a DC/DC junction box 4, a battery pack 5, a charging port 6, an onboard charger 7, an air-conditioning unit 8, and a 12-volt onboard battery 9, as shown in FIG. 1.

The travel motor unit 2 is a travel drive source configured from a travel drive motor and a speed reducer, and is disposed in a motor compartment M provided in the front of the vehicle. An output shaft (not shown) of the travel motor unit 2 is linked to left and right front wheels (only the left front wheel FL is shown), which are drive wheels. When a positive torque command is outputted to the drive motor inverter 3, the travel motor unit 2 performs a driving operation in which the power discharged from the battery pack 5 is used to generate drive torque, driving the left and right front wheels (powering). When a negative torque command is outputted to the drive motor inverter 3, the travel motor unit performs a power generating operation of converting the rotational energy from the left and right front wheels to electrical energy, and the battery pack 5 is charged with the generated power (regeneration).

The DC/DC junction box 4 houses a DC/DC converter, dispenses high-voltage discharged power from the battery pack 5, supplies power to a 12-volt power source system, and charges the 12-volt onboard battery 9. The DC/DC junction box 4, which has a regular-speed charging relay and a high-speed charging relay, is designed to be capable of switching a charging circuit in accordance with a charging mode.

The battery pack 5 is disposed in an underfloor space Y on the underside of a floor panel F, the space being positioned in the middle of the wheel base. This battery pack 5 is the power source for the travel motor unit 2 as well as the power source for the air-conditioning unit 8.

The charging port 6 is provided in a location, in the middle of the front of the vehicle, where a charging connector from an external power source such as a charging stand or home charging equipment is connected, and is covered in an openable and closeable manner by a port lid 6a. The charging port 6 has a regular charging port 6b and a high-speed charging port 6c. The regular charging port 6b is a charging port used during charging by home charging equipment, a regular charging stand, or the like, and is connected to the DC/DC junction box 4 via the onboard charger 7. The high-speed charging port 6c is a charging port used during charging by a high-speed charging stand, and is directly connected to the DC/DC junction box 4.

The air-conditioning unit 8 is disposed on the top side of the floor panel F, i.e. in a passenger compartment R, farther toward the front of the vehicle than the battery pack 5. The motor compartment M and a dashboard panel D sectioning the passenger compartment R are disposed between installment panels (not shown). The air-conditioning unit 8 blows conditioned air, of which the temperature has been adjusted so that the set temperature is achieved, into the passenger compartment R. A description is given hereinafter of the detailed configuration of the heat-pump-type air-conditioning device configured including this air-conditioning unit 8.

Overall System Configuration of Heat-Pump-Type Air-Conditioning Device

Figure 2:
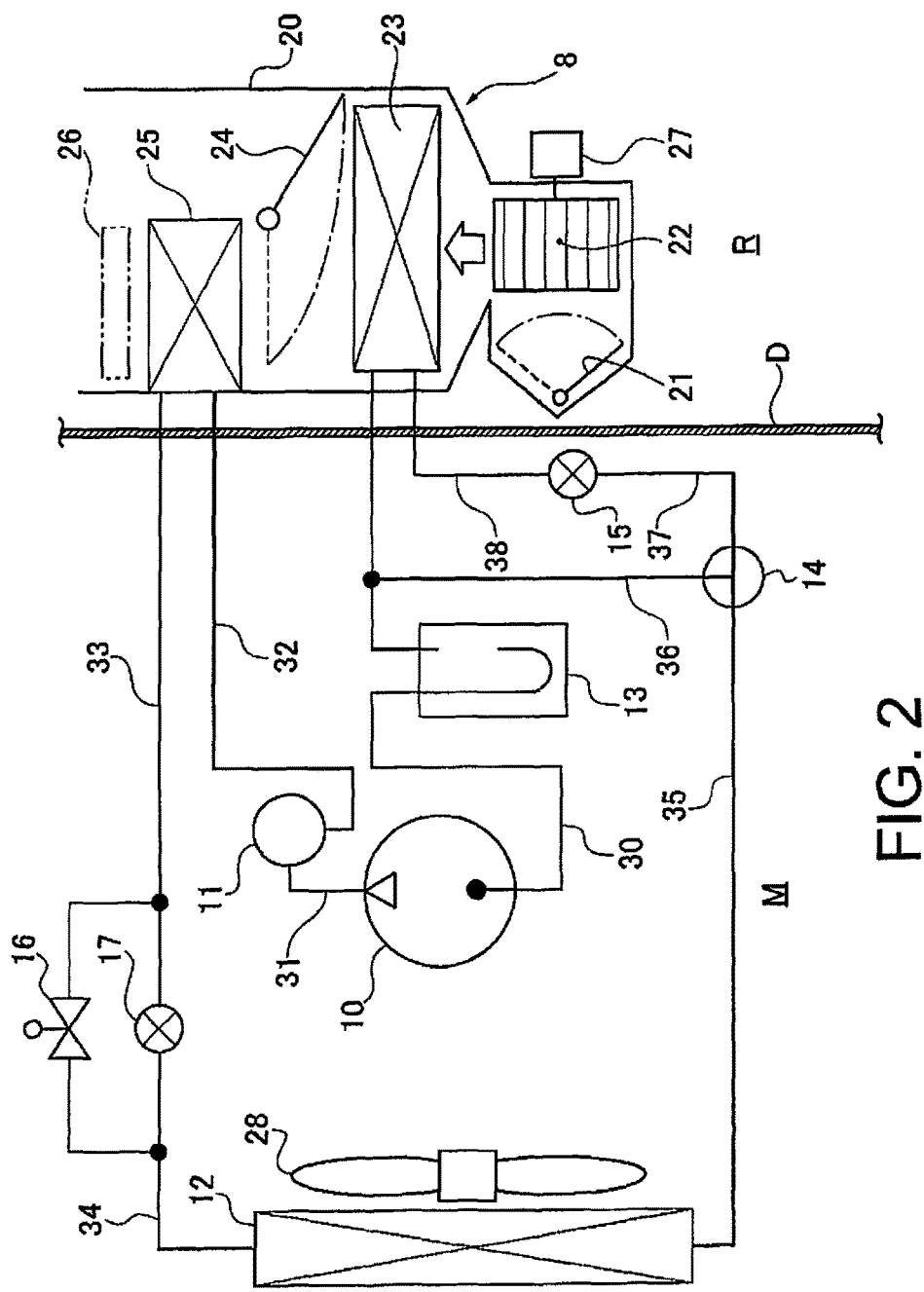
FIG. 2 is a system circuit diagram showing the entire heat-pump-type air-conditioning device in accordance with the first embodiment.

FIG. 2 is a system circuit configuration diagram showing the entire heat-pump-type air-conditioning device of the first embodiment. The overall system configuration of the heat-pump-type air-conditioning device is described below with reference to FIG. 2.

The heat-pump-type air-conditioning device of the first embodiment is divided by the dashboard panel D into the passenger compartment R and the motor compartment M, and the air-conditioning unit 8 is disposed in the passenger compartment R, as shown in FIG. 2. Disposed inside the motor compartment M are an electric compressor 10, a muffler 11 (the pulsation suppression device), an outdoor heat exchanger 12, an accumulator 13, a three-way valve 14, a cooling throttle 15, an electromagnetic valve 16, and a heating throttle 17.

The air-conditioning unit 8 comprises, inside a unit case 20, an inside-outside air switching door 21, a blower fan 22, an evaporator 23, a mode-switching door 24, a condenser 25, and a PTC heater 26.

Rotatably driven by a fan motor 27, the blower fan 22 leads in inside air or outside air selected by the inside-outside air switching door 21, and blows the air downstream where the evaporator 23 and other components are provided.

The evaporator 23 (a vaporizer), which is disposed in a position downstream of the blower fan 22, exhibits the function of evaporating low-temperature, low-pressure liquid coolant and absorbing heat when "cooling mode" or "dehumidifying and heating mode" is selected.

The mode-switching door 24, which is disposed in a position downstream of the evaporator 23, is opened so that blown air passes over the condenser 25 when "heating mode" or "dehumidifying and heating mode" is selected, and is closed so that blown air does not pass over the condenser 25 when "cooling mode" or "deicing mode" is selected. The term "deicing mode" refers to an ice-melting mode for melting ice adhering to the outdoor heat exchanger 12.

The condenser 25 (a condensing device), which is disposed in a position downstream of the evaporator 23 and the mode-switching door 24, exhibits the function of condensing and releasing the heat of high-temperature, high-pressure gas coolant when "heating mode" or "dehumidifying and heating mode" is selected.

The PTC heater 26, which is disposed in a position downstream of the condenser 25, is an auxiliary heat source added, for example, only in cases of a cold-region design. In other words, the condenser 25 is disposed in the unit case 20 and used as a heat source for heating in the case of a heat-pump-type air-conditioning device, and there is no particular need for the PTC heater 26 when the design is not for a cold region.

The electric compressor 10, which is a compression device driven by a motor, compresses low-temperature, low-pressure gas coolant sent from the accumulator 13 via a coolant intake pipe 30, yielding high-temperature, high-pressure gas coolant, which is then sent to a compressor-side coolant discharge pipe 31.

The muffler 11, which is the pulsation suppression device for suppressing pulsation of the coolant discharged from the electric compressor 10, suppresses pulsation which is pressure fluctuation in the high-temperature, high-pressure gas coolant sent from the electric compressor 10 via the compressor-side coolant discharge pipe 31, and feeds the coolant to a condenser-side coolant discharge pipe 32.

The outdoor heat exchanger 12, which is disposed in a position in the front of the vehicle, comprises a motor fan 28 in a position rearward in the vehicle from the heat exchange face. The outdoor heat exchanger 12 is fed coolant from the condenser 25 via coolant pipes 33, 34, and the outdoor heat exchanger either feeds coolant to the accumulator 13 via coolant pipes 35, 36 or feeds coolant to the evaporator 23 via coolant pipes 35, 37, 38. Specifically, the outdoor heat exchanger 12 is a heat exchanger that functions both as an evaporator and a condenser depending on the conditions, so as to be an evaporator (absorbing heat) during the heating mode and a condenser (releasing heat) during the cooling mode.

The accumulator 13 separates the gas-liquid mixed coolant sent from the outdoor heat exchanger 12 or the evaporator 23 into gas coolant and liquid coolant, and sends the separated gas coolant to the electric compressor 10 via the coolant intake pipe 30.

The three-way valve 14, the cooling throttle 15, the electromagnetic valve 16, and the heating throttle 17 constitute a plurality of valves disposed in the motor compartment M. The three-way valve 14 is a valve for switching between a coolant path interconencting the coolant pipe 35 and the coolant pipe 36, and a coolant path interconencting the coolant pipe 35 and the coolant pipe 37. When "cooling mode" is selected, the cooling throttle 15 expands the coolant sent from the outdoor heat exchanger 12 via the coolant pipes 35, 37 to low-temperature, low-pressure liquid coolant, which is sent to the evaporator 23 via the coolant pipe 38. The electromagnetic valve 16 is disposed in parallel with the heating throttle 17 between the coolant pipes 33, 34, and is a valve for switching between a coolant path passing through the heating throttle 17 (valve closed) and a coolant path dispelling the throttle effect (valve open). When "heating mode" is selected, the heating throttle 17 expands the coolant sent from the condenser 25 via the coolant pipe 33 to low-temperature, low-pressure liquid coolant, which is sent to the outdoor heat exchanger 12 via the coolant pipe 34.

Figure 3:
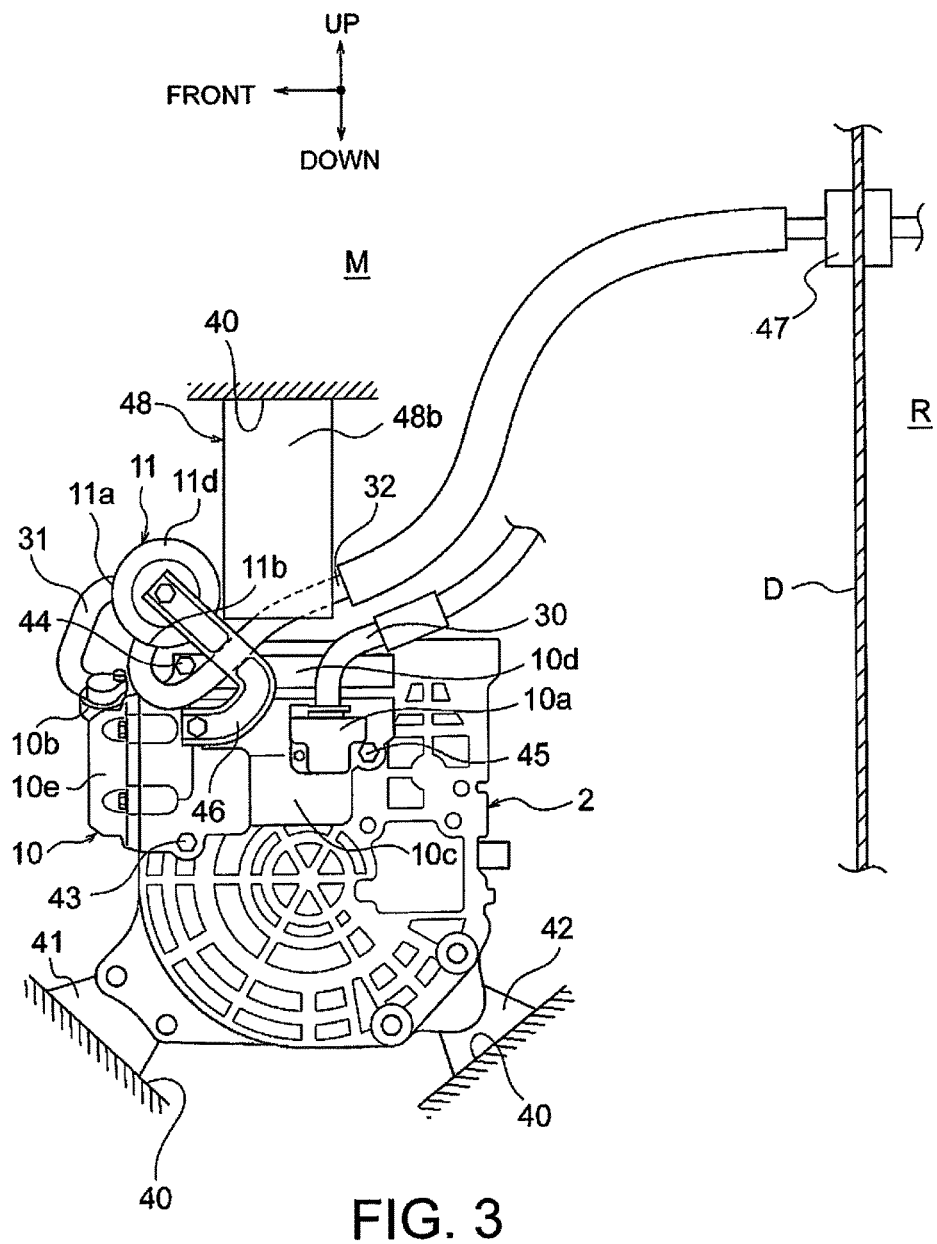
FIG. 3 is a side view showing the arrangement of the electric compressor and the muffler in the motor compartment in the heat-pump-type air-conditioning device in accordance with the first embodiment.
Figure 4:
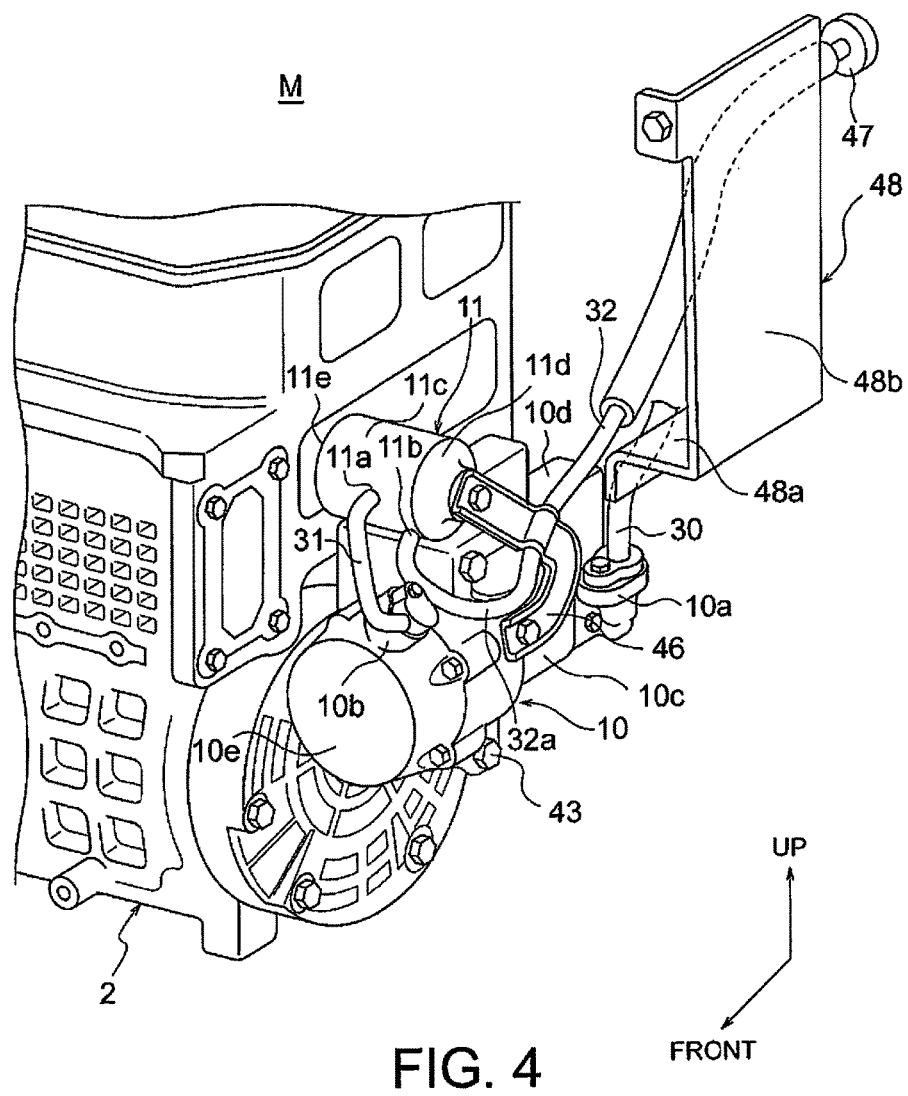
FIG. 4 is a perspective view showing the arrangement of the electric compressor and the muffler in the motor compartment in the heat-pump-type air-conditioning device in accordance with the first embodiment.

Detailed Configuration of the Apparatus Structural Components Disposed in the Motor Compartment FIGS. 3 and 4 show the arrangement of the electric compressor 10 and the muffler 11 in the motor compartment M in the heat-pump-type air-conditioning device of the first embodiment. The detailed configuration of the apparatus structural components disposed in the motor compartment is described below with reference to FIGS. 3 and 4.

As described above, in the case of a heat-pump-type air-conditioning device, three heat exchangers are used: the condenser 25 for releasing high-temperature heat into the passenger compartment R, the outdoor heat exchanger 12 which functions both as a condenser and an evaporator depending on the conditions, and the evaporator 23 used to cool the interior of the passenger compartment R. The electric compressor 10 disposed in the motor compartment M and the condenser 25 disposed in the passenger compartment R are linked via the following: compressor-side coolant discharge pipe 31→muffler 11→condenser-side coolant discharge pipe 32.

The muffler 11 is disposed in a position higher up in the vehicle than a coolant discharge port 10b of the electric compressor 10, and a coolant inflow port 11a of the muffler 11 is set at a position higher up in the vehicle than the a coolant outflow port 11b of the muffler 11, as shown in FIGS. 3 and 4. The coolant intake pipe 30 is linked to a coolant intake port 10a of the electric compressor 10 from the accumulator 13.

The compressor-side coolant discharge pipe 31 is a coolant pipe joining the coolant discharge port 10b of the electric compressor 10 and the coolant inflow port 11a of the muffler 11, and the condenser-side coolant discharge pipe 32 is a coolant pipe joining the coolant outflow port 11b of the muffler 11 and the condenser 25. The condenser-side coolant discharge pipe 32 is designed with a U-shaped curving pipe section 32a extending upward in the vehicle after the pipe extends farther down in the vehicle than the coolant outflow port 11b of the muffler 11, as shown in FIGS. 3 and 4.

The muffler 11 is a cylindrical container having a cylindrical plate section 11c and end plate sections 11d, 11e as shown in FIG. 4. The coolant inflow port 11a of the muffler 11 is designed to open laterally in a position in the middle of the cylindrical plate section 11c from the compressor-side coolant discharge pipe 31, and the coolant outflow port 11b of the muffler 11 is designed to open downward in a position in the bottom of the cylindrical plate section 11c.

The electric compressor 10 is configured integrally having a motor section 10c, an inverter section 10d, and a compression section 10e, as shown in FIGS. 3 and 4. The electric compressor 10 is further elastically supported by soft mounts 43, 44, 45 on the travel motor unit 2, which is elastically supported by soft mounts 41, 42 or the like on a vehicle body 40 (a suspension member or the like) as shown in FIG. 3. The muffler 11 is supported via a muffler bracket 46 which is bolted at one end to the electric compressor 10 and bolted at the other end to the end plate section 11d. Thus, the electric compressor 10 is elastically supported on the travel motor unit 2 disposed in the lowest position of the motor compartment M, whereby the muffler 11 is disposed in a position higher than the coolant discharge port 10b of the electric compressor 10. Furthermore, a connection coupling 47 of the condenser-side coolant discharge pipe 32 of the dashboard panel D is disposed in a position higher than the muffler 11.

In the motor compartment M which is positioned higher up in the vehicle than the electric compressor 10, a valve bracket 48 has a bottom plate section 48a and a side plate section 48b, and is secured to the vehicle body 40 (a side member or the like), as shown in FIGS. 3 and 4. This causes a plurality of valves, namely the three-way valve 14, the cooling throttle 15, the electromagnetic valve 16, and the heating throttle 17, to be included as structural components disposed in the motor compartment M within a system circuit comprising the electric compressor 10, as shown in FIG. 2. These valves 14, 15, 16, and 17 are not attached in a random arrangement, but are attached as being gathered together on the side plate section 48b of the valve bracket 48 secured in the motor compartment M.

The operations are described next. The operations in the heat-pump-type air-conditioning device in accordance with the first embodiment into "Mode-specific operations according to the air-conditioning mode selection," "Coolant back-flow prevention operation of the muffler," and "Motor compartment structural component supporting operation."

Mode-Specific Operations According to
Air-Conditioning Mode Selection

In the heat-pump-type air-conditioning device of the first embodiment, the air-conditioning modes can be divided into "heating mode," "cooling mode," "dehumidifying and heating mode," and "deicing mode." The mode-specific operations according to the air-conditioning mode selection are described below with reference to FIGS. 5 to 8.

Figure 5:
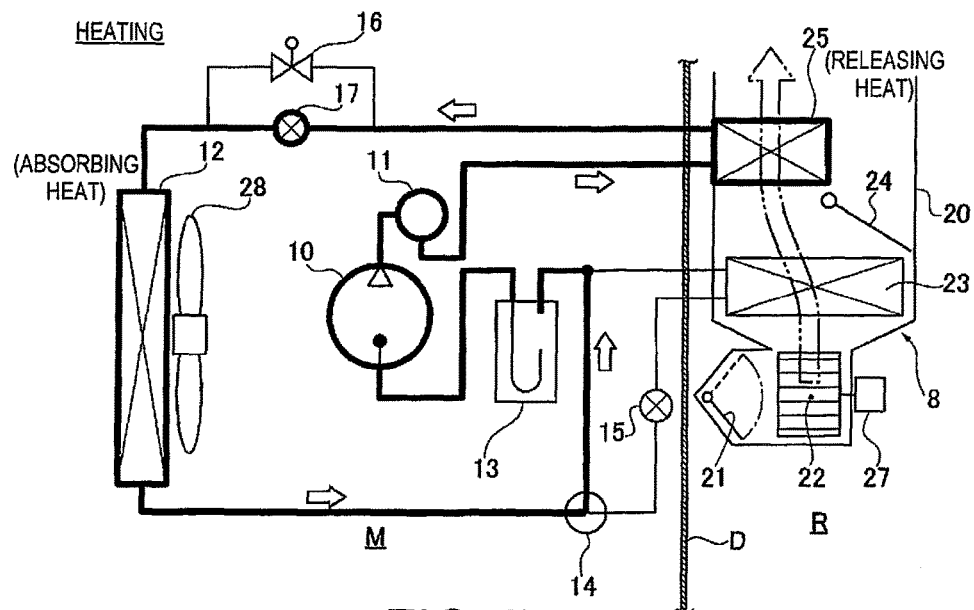
FIG. 5 is an explanatory diagram of the heating mode operation, showing the workings of the heat-pump-type air-conditioning device in accordance with the first embodiment during the heating mode.

Heating Mode (FIG. 5)

When "heating mode" is selected, the three-way valve 14 selects a path that avoids the cooling throttle 15, and the electromagnetic valve 16 closes and selects a path that uses the heating throttle 17. The mode-switching door 24 is opened so that blown air passes over the condenser 25. In "heating mode," gas coolant sent from the accumulator 13 is compressed in the electric compressor 10 to high-temperature, high-pressure gas coolant. The gas coolant compressed to a high temperature and high pressure in the electric compressor 10 enters the condenser 25 via the muffler 11 as shown by the arrow in FIG. 5, and the high-temperature, high-pressure gas coolant is condensed, releasing heat. The released heat from the condenser 25 is blown into the passenger compartment R, providing heat to the air in the passenger compartment R, and the temperature is raised in the passenger compartment interior, heating the interior. The condensed coolant then passes through the heating throttle 17, becoming low-temperature, low-pressure liquid coolant, and the low-temperature, low-pressure liquid coolant is evaporated in the outdoor heat exchanger 12, absorbing heat. The term "heat pump" comes from this drawing of heat from the air in the outdoor heat exchanger 12.

Figure 6:
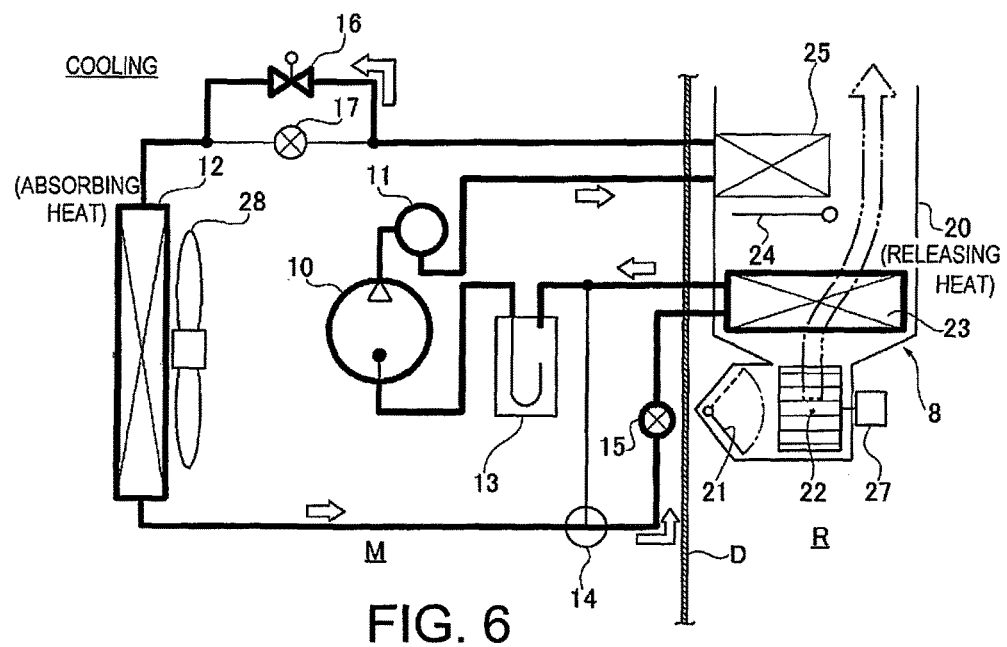
FIG. 6 is an explanatory diagram of the cooling mode operation, showing the workings of the heat-pump-type air-conditioning device in accordance with the first embodiment during the cooling mode.

Cooling Mode (FIG. 6)

When "cooling mode" is selected, the three-way valve 14 selects a path that passes through the cooling throttle 15, and the electromagnetic valve 16 opens and selects a path that does not use the heating throttle 17. The mode-switching door 24 is closed so that blown air does not pass over the condenser 25. In "cooling mode," gas coolant sent from the accumulator 13 is compressed in the electric compressor 10 to high-temperature, high-pressure gas coolant. The gas coolant compressed to a high temperature and high pressure in the electric compressor 10 enters the condenser 25 via the muffler 11 as shown by the arrow in FIG. 6, but because the mode-switching door 24 is closed, heat exchange is not performed, and the coolant passes unchanged through the electromagnetic valve 16 and enters the outdoor heat exchanger 12. In the outdoor heat exchanger 12, the high-temperature, high-pressure gas coolant is condensed, releasing heat to become room-temperature, high-pressure gas-liquid mixed coolant, which is expanded in the next cooling throttle 15 to low-temperature, low-pressure liquid coolant. In the evaporator 23 disposed in the passenger compartment R, the low-temperature, low-pressure liquid coolant is evaporated, absorbing heat and taking heat from the air in the passenger compartment R, and the temperature is lowered in the passenger compartment interior, cooling the interior.

Figure 7:
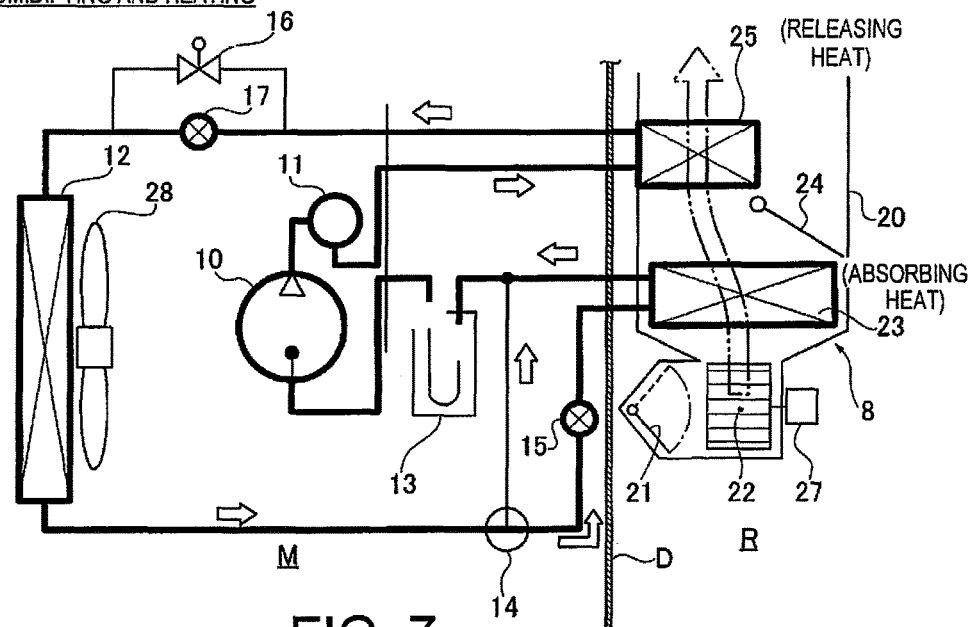
FIG. 7 is an explanatory diagram of the dehumidifying and heating mode operation, showing the workings of the heat-pump-type air-conditioning device in accordance with the first embodiment during the dehumidifying and heating mode.

Dehumidifying and Heating Mode (FIG. 7)

When "dehumidifying and heating mode" is selected, the three-way valve 14 selects a path that passes through the cooling throttle 15, and the electromagnetic valve 16 closes and selects a path that uses the heating throttle 17. The mode-switching door 24 is opened so that blown air passes over the condenser 25. In "dehumidifying and heating mode," similar to "heating mode," gas coolant sent from the accumulator 13 is compressed in the electric compressor 10 to high-temperature, high-pressure gas coolant. The gas coolant compressed to a high temperature and high pressure in the electric compressor 10 enters the condenser 25 via the muffler 11 as shown by the arrow in FIG. 7, and the high-temperature, high-pressure gas coolant is condensed, releasing heat. The released heat from the condenser 25 is blown into the passenger compartment R, providing heat to the air in the passenger compartment R, and the temperature is raised in the passenger compartment interior, heating the interior. The condensed coolant then passes through the heating throttle 17, becoming low-temperature, low-pressure liquid coolant, which enters the outdoor heat exchanger 12. At this time, if the coolant temperature of the heating throttle 17 is higher than the outside air temperature, the outdoor heat exchanger 12 functions as a condensing device, and if the coolant temperature of the heating throttle 17 is lower than the outside air temperature, the outdoor heat exchanger 12 functions as an evaporating device. Entering the evaporator 23 via the cooling throttle 15, the low-temperature, low-pressure liquid coolant is evaporated, absorbing heat, and saturated water vapor condenses as dew, dehumidifying the passenger compartment. Specifically, in this dehumidifying and heating mode, three heat exchangers are used: the condenser 25, the outdoor heat exchanger 12, and the evaporator 23; and the dehumidifying capability and reheating capability are controlled.

Figure 8:
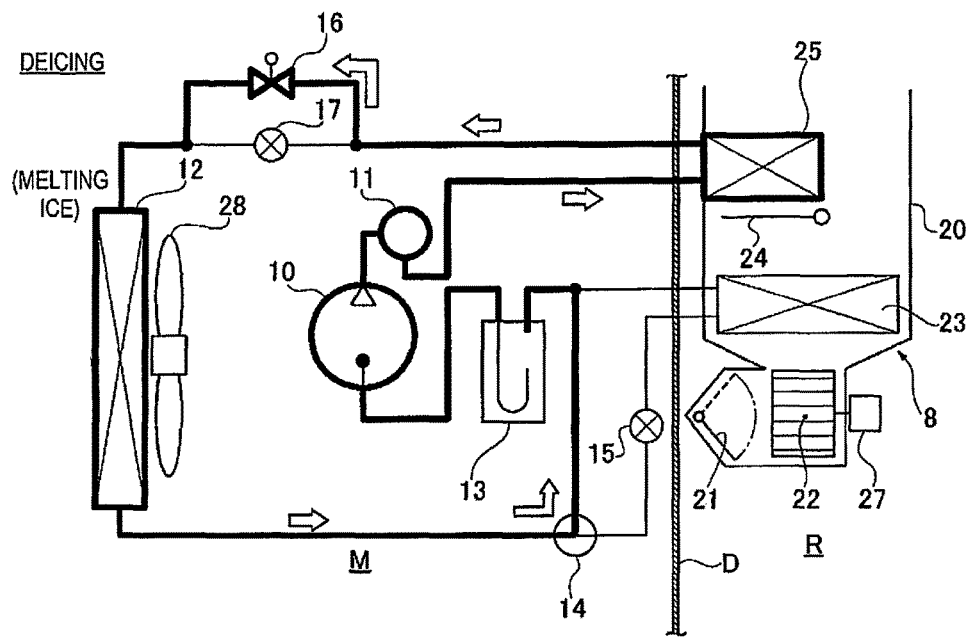
FIG. 8 is an explanatory diagram of the deicing mode operation, showing the workings of the heat-pump-type air-conditioning device in accordance with the first embodiment during the deicing mode (the ice-melting mode).

Deicing Mode (FIG. 8)

When "deicing mode" is selected, the three-way valve 14 selects a path that passes through the cooling throttle 15, and the electromagnetic valve 16 opens and selects a path that does not use the heating throttle 17. The mode-switching door 24 is closed, and the air-blowing of the fan 22 is stopped. In "deicing mode," gas coolant sent from the accumulator 13 is compressed in the electric compressor 10 to high-temperature, high-pressure gas coolant. The gas coolant compressed to a high temperature and high pressure in the electric compressor 10 enters the condenser 25 via the muffler 11 as shown by the arrow in FIG. 8, but because the mode-switching door 24 is closed, heat exchange is not performed, and the coolant passes unchanged through the electromagnetic valve 16 and enters the outdoor heat exchanger 12. In the outdoor heat exchanger 12, the high-temperature, high-pressure gas coolant is condensed, releasing heat, whereby ice is melted. The coolant of the outdoor heat exchanger 12 is then sent unchanged to the accumulator 13.

Coolant Backflow Prevention Operation of Muffler

The electric compressor 10 is operating in the above-described mode-specific operations according to the air-conditioning mode selection, but after the heat-pump-type air-conditioning device is stopped, measures must be taken to prevent the coolant in the electric compressor 10 from back-flowing from the muffler 11. A coolant backflow prevention operation of the muffler that reflects this is described below with reference to FIGS. 9 and 10.

First, the reasons for setting the muffler in a position partway along a coolant discharge pipe of the electric compressor are described. A refrigeration-cycle-type air-conditioning device installed in a vehicle with an engine or the like is configured such that only the evaporator is disposed in the passenger compartment, the condenser is disposed outside of the passenger compartment, and the discharge port of the compressor is linked to the condenser outside of the passenger compartment. When this is installed in an electric vehicle, the engine waste heat cannot be utilized, and a heating heat source such as a PTC heater must therefore be provided. In "heating mode," the amount of battery energy consumed increases, and the actual travel distance decreases proportionately. In view of this, the actual travel distance when heating is needed in an electric vehicle can be improved by installing a heat-pump-type air-conditioning device that can utilize a coolant to ensure a heating heat source as an air-conditioning device. However, when a heat-pump-type air-conditioning device is installed, the configuration involves the coolant discharge port of the electric compressor being linked to a condenser disposed in the passenger compartment, which is different from a refrigeration-cycle-type air-conditioning device in which the discharge port of the compressor is linked to a condenser outside of the passenger compartment. Consequently, when there is pulsation in the coolant discharged from the electric compressor, the sound vibration performance in the passenger compartment is adversely affected when the coolant flows into the condenser disposed in the passenger compartment; therefore, in an electric vehicle in which a high level of quietness is required, pulsation is preferably minimized before the coolant flows into the condenser.

Figure 9:
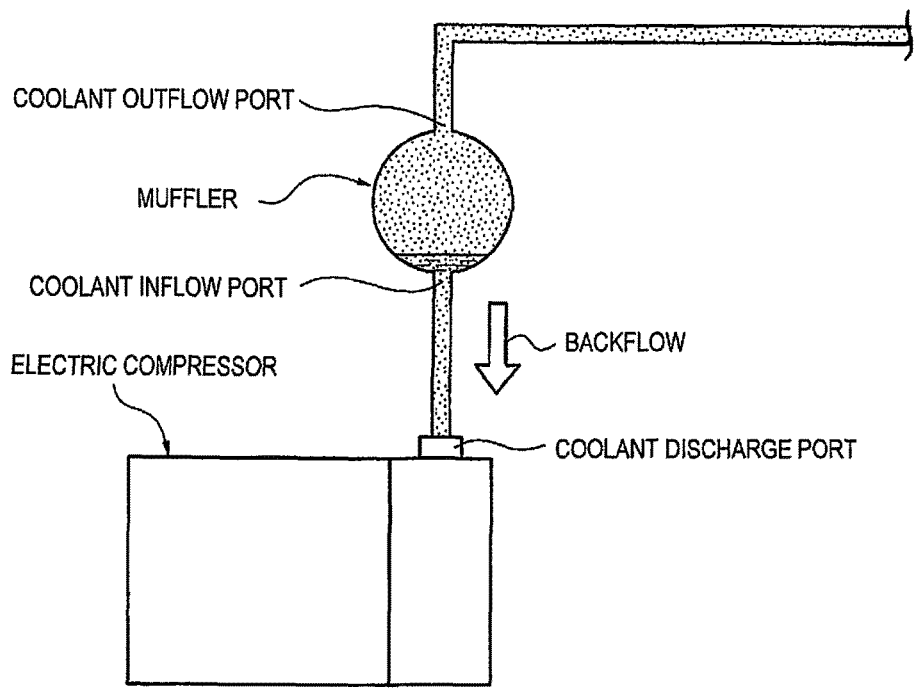
FIG. 9 is an action explanatory diagram showing coolant backflow operation in the heat-pump-type air-conditioning device of the comparative example.

Thus, when the muffler is set in a position partway along a coolant discharge pipe of the electric compressor and the muffler is disposed unchanged in a position higher up in the vehicle than the coolant discharge port, the coolant outflow port of the muffler is positioned higher than the coolant inflow port of the muffler, as shown in FIG. 9. This configuration is used as a comparative example. However, when the electric compressor stops in the comparative example, some of the gas coolant remaining in the muffler and the coolant discharge pipe liquefies, and this liquid coolant accumulates in the bottom of the muffler. Coolant backflow occurs in which this accumulated liquid coolant returns unchanged to the coolant discharge port of the electric compressor from the coolant inflow port of the muffler.

Figure 10:
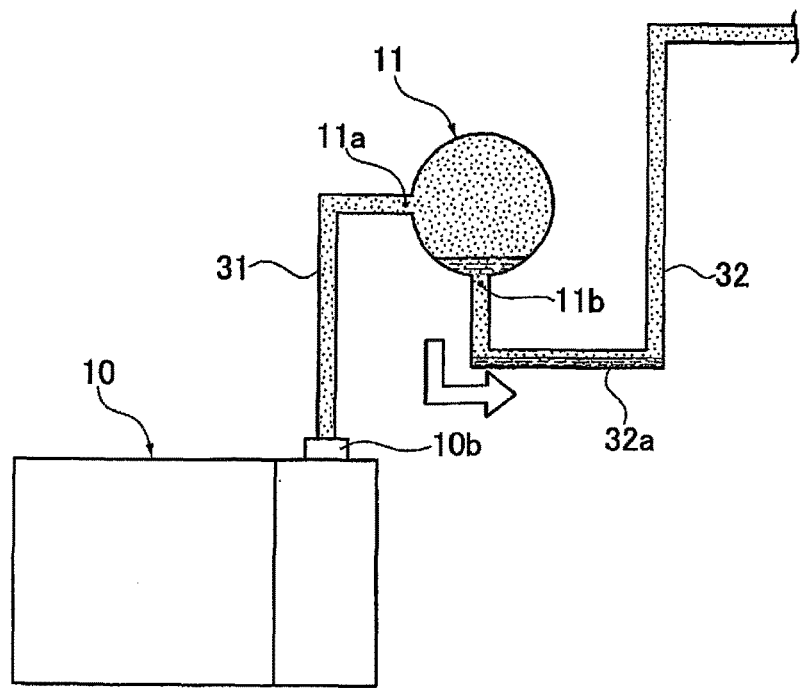
FIG. 10 is an action explanatory diagram showing coolant backflow operation in the heat-pump-type air-conditioning device in accordance with the first embodiment.

In the first embodiment, a configuration is employed in which the coolant inflow port 11a of the muffler 11, which is disposed in a position higher up in the vehicle than the coolant discharge port 10b of the electric compressor 10, is set in a position higher up in the vehicle than the coolant outflow port 11b of the muffler 11, as shown in FIG. 10. Therefore, when the electric compressor 10 stops, some of the gas coolant remaining in the muffler 11 and the compressor-side coolant discharge pipe 31 liquefies, and this liquid coolant accumulates in the bottom of the muffler 11. This accumulated liquid coolant flows from the coolant outflow port 11b set in a lower position than the coolant inflow port 11a of the muffler 11, through the condenser-side coolant discharge pipe 32. In other words, the liquid level of coolant accumulating in the bottom of the muffler 11 is stipulated to be the height position of the coolant outflow port 11b, thus preventing coolant backflow to the electric compressor 10 from the coolant inflow port 11a set in a position higher than the coolant outflow port 11b. Thus, the positional relationship of the coolant inflow port 11a and coolant outflow port 11b of the muffler 11, which is disposed in a position higher up in the vehicle than the coolant discharge port 10b of the electric compressor 10, is configured such that the coolant inflow port 11a is set at a position higher than the coolant outflow port 11b. Therefore, when the compressor stops coolant backflow from the muffler 11 to the electric compressor 10 is prevented while the muffler 11 is set in a position above the electric compressor 10.

In the first embodiment, a configuration is employed in which the condenser-side coolant discharge pipe 32 has a U-shaped curving pipe section 32a extending upward in the vehicle after the pipe extends farther down in the vehicle than the coolant outflow port 11b of the muffler 11. Therefore, liquid coolant accumulated in the bottom of the muffler 11 or liquid coolant that has liquefied in a pipe channel upstream of the U-shaped curving pipe section 32a will then accumulate in the bottom of the U-shaped curving pipe section 32a, which is the lowest part of the coolant pipe system including the muffler 11. Therefore, when the compressor stops, the liquid coolant is absorbed by the U-shaped curving pipe section 32a even if the coolant volume increases, whereby coolant backflow from the muffler 11 to the electric compressor 10 is reliably prevented.

In the first embodiment, a configuration is employed in which the coolant inflow port 11a of the muffler 11 is designed to open laterally in a position in the middle of the cylindrical plate section 11c from the compressor-side coolant discharge pipe 31, and the coolant outflow port 11b of the muffler 11 is designed to open downward in a position in the bottom of the cylindrical plate section 11c. Thus, the opening directions of the coolant inflow port 11a and the coolant outflow port 11b are in a positional relationship of being at right angles to each other. Therefore, when the electric compressor 10 is driven, gas coolant pulsating at high temperature and high pressure does not exit unchanged from the coolant outflow port 11b even if the coolant enters the coolant inflow port 11a of the muffler 11. In other words, the gas coolant entering the muffler 11 reaches the inside walls of the muffler and temporarily stagnates in the interior of the muffler 11, and pulsation of the gas coolant is therefore effectively suppressed. Additionally, because the coolant outflow port 11b of the muffler 11 is set in a position in the bottom of the cylindrical plate section 11c, liquid coolant is prevented from accumulating in the bottom of the muffler 11.

Motor Compartment Structural Component Supporting Operation

In the first embodiment, the electric compressor 10 is further elastically supported by soft mounts 43, 44, 45 on the travel motor unit 2, which is elastically supported by soft mounts 41, 42 or the like on a vehicle body 40. A configuration is employed in which the muffler 11 is supported via a muffler bracket 46 which is bolted at one end to the electric compressor 10 and bolted at the other end to the end plate section 11*d*. Specifically, the electric compressor 10 and the muffler 11 are mounted to the vehicle body 40 by a twofold antivibration support structure. Therefore, shaking of the electric compressor 10 and the muffler 11 in response to vibration input from the vehicle body 40 is kept to a minimum, the electric compressor 10 exhibits a stable compression function, and the muffler 11 exhibits a stable pulsation suppression function.

In the first embodiment, a configuration is employed in which a valve bracket 48 having a bottom plate section 48*a* and a side plate section 48*b* is secured to the vehicle body 40 in the motor compartment M positioned higher up in the vehicle than the electric compressor 10, and a plurality of valves 14, 15, 16, and 17 are attached as being gathered together on the side plate section 48*b* of the valve bracket 48. Therefore, the bottom plate section 48*a* shields the valves 14, 15, 16, and 17 from rocks and the like thrown up from below, whereby the valves 14, 15, 16, and 17 are protected from damage. Additionally, because the valve bracket 48 is secured in a position higher up in the vehicle than the electric compressor 10, the coolant pipe system connected to the valves 14, 15, 16, and 17 is placed higher in the vehicle than the electric compressor 10, and the coolant pipe system is protected.

Next, the effects are described. In the heat-pump-type air-conditioning device of the first embodiment, the effects given as examples below can be achieved.

(1) A heat-pump-type air-conditioning device comprising an electric compressor 10 disposed in a motor compartment M of an electric vehicle 1, a condenser 25 disposed in a passenger compartment R, and a coolant discharge pipe 31, 32 linking the electric compressor 10 and the condenser 25 and channeling coolant from the electric compressor 10 to the condenser 25; wherein a pulsation suppression device (a muffler 11) for suppressing pulsation of the coolant discharged from the electric compressor 10 is provided in a position partway along the coolant discharge pipe 31, 32; the pulsation suppression device (the muffler 11) is disposed in a position higher up in the vehicle than a coolant discharge port 10*b* of the electric compressor 10; and a coolant inflow port 11*a* of the pulsation suppression device (the muffler 11) is set in a position higher up in the vehicle than a coolant outflow port 11*b* of the pulsation suppression device (the muffler 11) (FIG. 3). Therefore, coolant backflow from the pulsation suppression device (the muffler 11) to the electric compressor 10 when the compressor is stopped can be prevented while the pulsation suppression device (the muffler 11) is set in a position above the electric compressor 10.

(2) The coolant discharge pipe is divided into a compressor-side coolant discharge pipe 31 joining the coolant discharge port 10*b* of the electric compressor 10 and the coolant inflow port 11*a* of the pulsation suppression device (the muffler 11), and a condenser-side coolant discharge pipe 32 joining the coolant outflow port 11*b* of the pulsation suppression device (the muffler 11) and the condenser 25; and the condenser-side coolant discharge pipe 32 is set so as to extend lower in the vehicle than the coolant outflow port 11*b* of the pulsation suppression device (the muffler 11), and then to extend back upward in the vehicle (FIG. 3). Therefore, in addition to the effect in (1), the apparatus exhibits the operation of absorbing the increase in liquid coolant volume when the compressor stops, whereby coolant backflow from the pulsation suppression device (the muffler 11) to the electric compressor 10 can be reliably prevented.

(3) The pulsation suppression device is a muffler 11 in the form of a cylindrical container having a cylindrical plate section 11*c* and end plate sections 11*d*, 11*e*; and the coolant inflow port 11*a* of the muffler 11 is designed to open laterally in a position in the middle of the cylindrical plate section 11*c* from the compressor-side coolant discharge pipe 31, and the coolant outflow port 11*b* of the muffler 11 is designed to open downward in a position in the bottom of the cylindrical plate section 11*c* (FIG. 4). Therefore, in addition to the effect in (2), pulsation of the gas coolant can be effectively suppressed by the muffler 11 when the electric compressor 10 is operating, and accumulation of the liquid coolant in the bottom of the muffler 11 can be prevented when the electric compressor 10 stops.

(4) The electric compressor 10 is soft-mounted to a travel motor unit 2 disposed in the motor compartment M and soft-mounted to a vehicle body 40; and the muffler 11 is supported via a muffler bracket 46 secured at one end to the electric compressor 10 and secured at the other end to the end plate section 11*d* (FIG. 3). Therefore, in addition to the effects in (1) to (3), the electric compressor 10 and the muffler 11 are supported on the vehicle body 40 by a twofold antivibration support structure, whereby the compression function of the electric compressor 10 and the pulsation suppression function of the muffler 11 can be exhibited in a stable manner.

(5) In the air-conditioning system circuitry comprising the electric compressor 10, a plurality of valves 14, 15, 16, and 17 as structural components are disposed in the motor compartment M; a valve bracket 48 having a bottom plate section 48*a* and a side plate section 48*b* is secured in the motor compartment M positioned higher up in the vehicle than the electric compressor 10; and the valves 14, 15, 16, and 17 are attached as being gathered together on the side plate section 48*b* of the valve bracket 48 secured in the motor compartment M (FIG. 4). Therefore, in addition to the effects in (1) to (4), the valves 14, 15, 16, and 17 can be protected from damage, and protection of the coolant pipe system connected to the valves 14, 15, 16, and 17 can be achieved.

The heat-pump-type air-conditioning device of the present invention was described above on the basis of the first embodiment, but the specific configuration is not limited to the first embodiment, and alterations, additions, and other such changes to the design are allowed so long as they do not deviate from the scope of the invention according to the claims.

In the first embodiment, an example of a muffler 11 in the form of a cylindrical container was presented as the pulsation suppression device. However, if the pulsation suppression device is device having a function for suppressing pulsation of the coolant discharged from the electric compressor, the specific configuration is not limited to a muffler in the form of a cylindrical container.

In the first embodiment, an example was presented in which the heat-pump-type air-conditioning device of the present invention was applied to a sedan-type electric vehicle equipped only with a travel motor unit. However, the heat-pump-type air-conditioning device of the present invention can of course be applied not only to sedans, but also to various electric vehicles such as wagons, minivans, and SUVs. Furthermore, the apparatus can also be applied to a plug-in hybrid electric vehicle equipped with a travel motor unit and an engine.

The invention claimed is:

1. A heat-pump-type air-conditioning device comprising:
an electric compressor configured to be disposed in a motor compartment of an electric vehicle;
a condenser disposed in a passenger compartment;
a coolant discharge pipe linking the electric compressor and the condenser and channeling coolant from the electric compressor to the condenser; and
a pulsation suppression device provided in a position partway along the coolant discharge pipe to receive coolant discharged from the electric compressor and suppress pulsation of the coolant discharged from the electric compressor, the pulsation suppression device being disposed at a position higher up in the vehicle than a coolant discharge port of the electric compressor; the pulsation suppression device having a coolant inflow port set in a position higher up in the vehicle than a coolant outflow port of the pulsation suppression device, the pulsation suppression device being a muffler,
the coolant discharge pipe being divided into a compressor-side coolant discharge pipe joining the coolant discharge port of the electric compressor and the coolant inflow port of the pulsation suppression device, and a condenser-side coolant discharge pipe joining the coolant outflow port of the pulsation suppression device and the condenser; and
the condenser-side coolant discharge pipe being set so as to extend lower in the vehicle than the coolant outflow port of the pulsation suppression device, and then to extend back upward in the vehicle to a connection coupling of the condenser-side coolant discharge pipe of a dashboard panel, the connection coupling being disposed in a position higher than the pulsation suppression device.

2. A heat-pump-type air-conditioning device comprising:
an electric compressor configured to be disposed in a motor compartment of an electric vehicle;
a condenser disposed in a passenger compartment;
a coolant discharge pipe linking the electric compressor and the condenser and channeling coolant from the electric compressor to the condenser; and
a pulsation suppression device provided in a position partway along the coolant discharge pipe to receive coolant discharged from the electric compressor and suppress pulsation of the coolant discharged from the electric compressor, the pulsation suppression device being disposed at a position higher up in the vehicle than a coolant discharge port of the electric compressor; the pulsation suppression device having a coolant inflow port set in a position higher up in the vehicle than a coolant outflow port of the pulsation suppression device,
the pulsation suppression device being a muffler in the form of a cylindrical container having a cylindrical plate section and end plate sections; and
the coolant inflow port of the muffler being designed to open radially laterally in a position in a middle of the cylindrical plate section from the compressor-side coolant discharge pipe, and the coolant outflow port of the muffler is designed to open downward in a position in a bottom of the cylindrical plate section.

3. A heat-pump-type air-conditioning device comprising:
an electric compressor configured to be disposed in a motor compartment of an electric vehicle;
a condenser disposed in a passenger compartment;
a coolant discharge pipe linking the electric compressor and the condenser and channeling coolant from the electric compressor to the condenser; and
a pulsation suppression device provided in a position partway along the coolant discharge pipe to receive coolant discharged from the electric compressor and suppress pulsation of the coolant discharged from the electric compressor, the pulsation suppression device being disposed at a position higher up in the vehicle than a coolant discharge port of the electric compressor; the pulsation suppression device having a coolant inflow port set in a position higher up in the vehicle than a coolant outflow port of the pulsation suppression device,
the electric compressor being soft-mounted to a travel motor unit that is disposed in the motor compartment and soft-mounted to a vehicle body; and
the pulsation suppression device is a muffler supported via a muffler bracket that is secured at a first longitudinal end to the electric compressor and that is secured at a second longitudinal end to an end plate section of the muffler.

4. The heat-pump-type air-conditioning device according to claim 1, further comprising
a valve bracket having a bottom plate section and a side plate section secured to the vehicle body in the motor compartment.

5. The heat-pump-type air-conditioning device according to claim 2, further comprising
a valve bracket having a bottom plate section and a side plate section secured to the vehicle body in the motor compartment.

6. The heat-pump-type air-conditioning device according to claim 3, further comprising
a valve bracket having a bottom plate section and a side plate section secured to the vehicle body in the motor compartment.

* * * * *